United States Patent [19]
Pijanowski

[11] Patent Number: 5,816,765
[45] Date of Patent: Oct. 6, 1998

[54] VEHICLE WITH IMPROVED MULTI-POSITIONABLE FLATBED

[76] Inventor: Joseph A. Pijanowski, 14351 Irving St., Brooksville, Fla. 34609

[21] Appl. No.: 833,714

[22] Filed: Apr. 9, 1997

[51] Int. Cl.⁶ ........................................................ B60P 1/16
[52] U.S. Cl. ................................ 414/477; 414/480; 298/9
[58] Field of Search ................................ 414/477–480, 414/491, 494, 543; 298/9

[56] References Cited

U.S. PATENT DOCUMENTS

| | | | |
|---|---|---|---|
| 399,806 | 3/1889 | Wayman | 298/9 |
| 2,174,956 | 10/1939 | Allison | 298/9 |
| 2,278,446 | 4/1942 | Hutchinson | 298/9 |
| 2,621,072 | 12/1952 | Sherburne | 298/9 |
| 2,621,814 | 12/1952 | Lisota | 414/477 |
| 2,786,590 | 3/1957 | Edwards et al. | 298/9 X |
| 3,458,074 | 7/1969 | Railey | 414/479 |
| 4,639,182 | 1/1987 | Inaba et al. | 414/543 |
| 5,011,362 | 4/1991 | Pijanowski | 414/480 |
| 5,133,633 | 7/1992 | Grata | 414/477 |
| 5,263,807 | 11/1993 | Pijanowski | 414/480 |

FOREIGN PATENT DOCUMENTS

| | | | |
|---|---|---|---|
| 2372050 | 7/1978 | France | 414/477 |
| 3206805 | 9/1983 | Germany | 414/494 |
| 505513 | 5/1939 | United Kingdom | 298/9 |

*Primary Examiner*—David A. Bucci

[57] ABSTRACT

A truck with a cab at a front end thereof and a frame situated at a rear end thereof, the truck including a flat bed adapted for supporting a vehicle thereon and securement mechanism for coupling the flat bed to the frame. The securement mechanism includes a swivel mechanism situated between the frame and the flat bed. The swivel mechanism is adapted to rotate the flat bed about a vertical axis. The swivel mechanism is further designed to rotate the flat bed about a vertical axis through a span of at least 180 degrees. A hinge is situated between the frame and the flat bed to permit the pivoting of the flat bed about a horizontal axis. Next provided is a lift mechanism situated between the frame and the flat bed for allowing the lifting of a front end of the flat bed about the axis of the hinge.

9 Claims, 4 Drawing Sheets

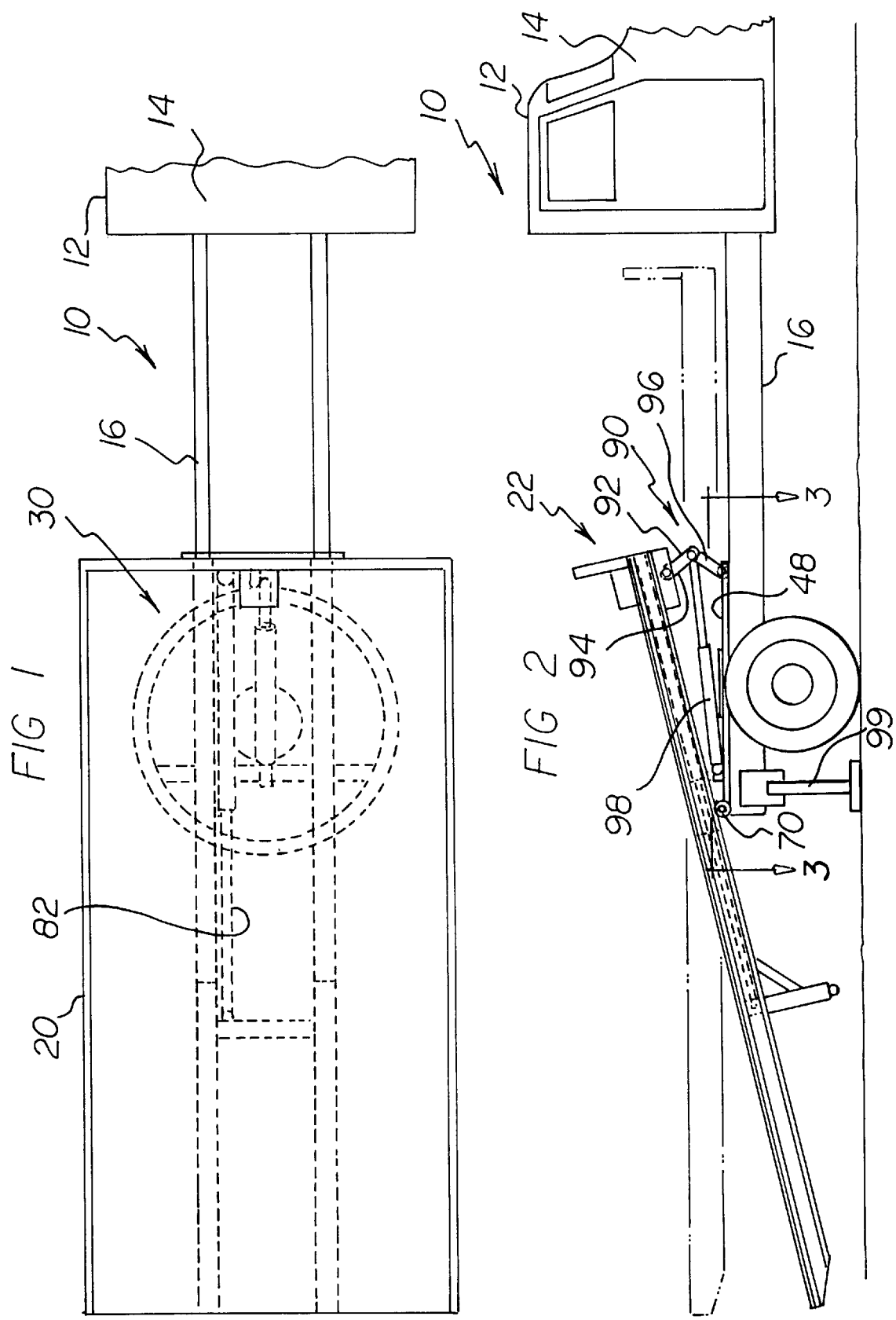

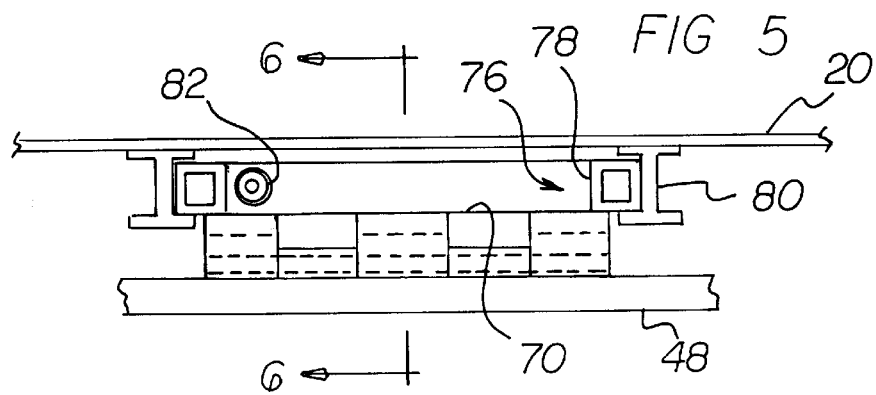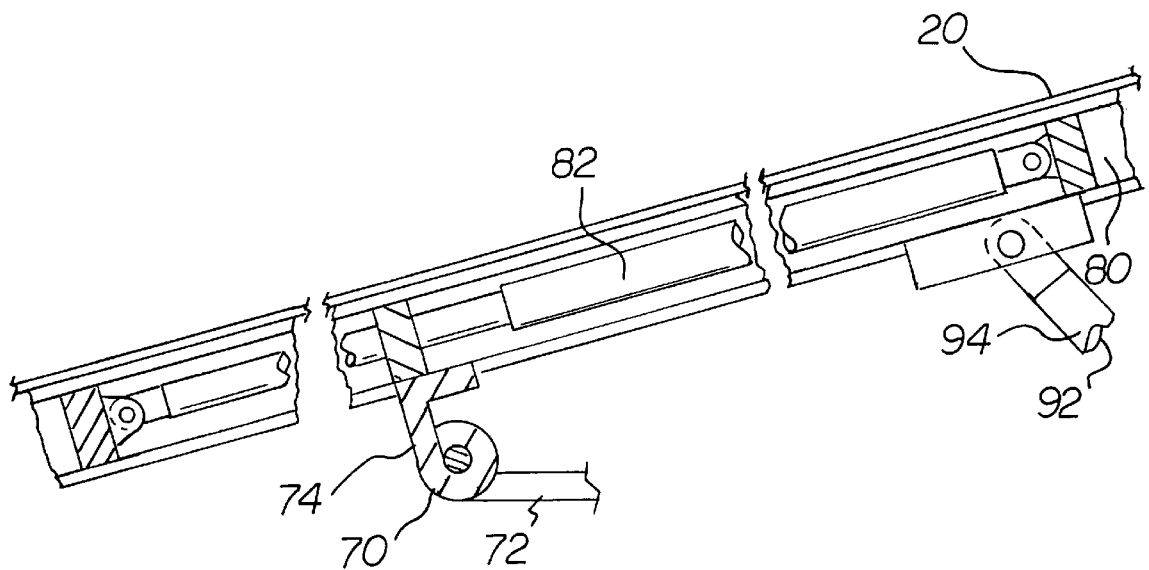

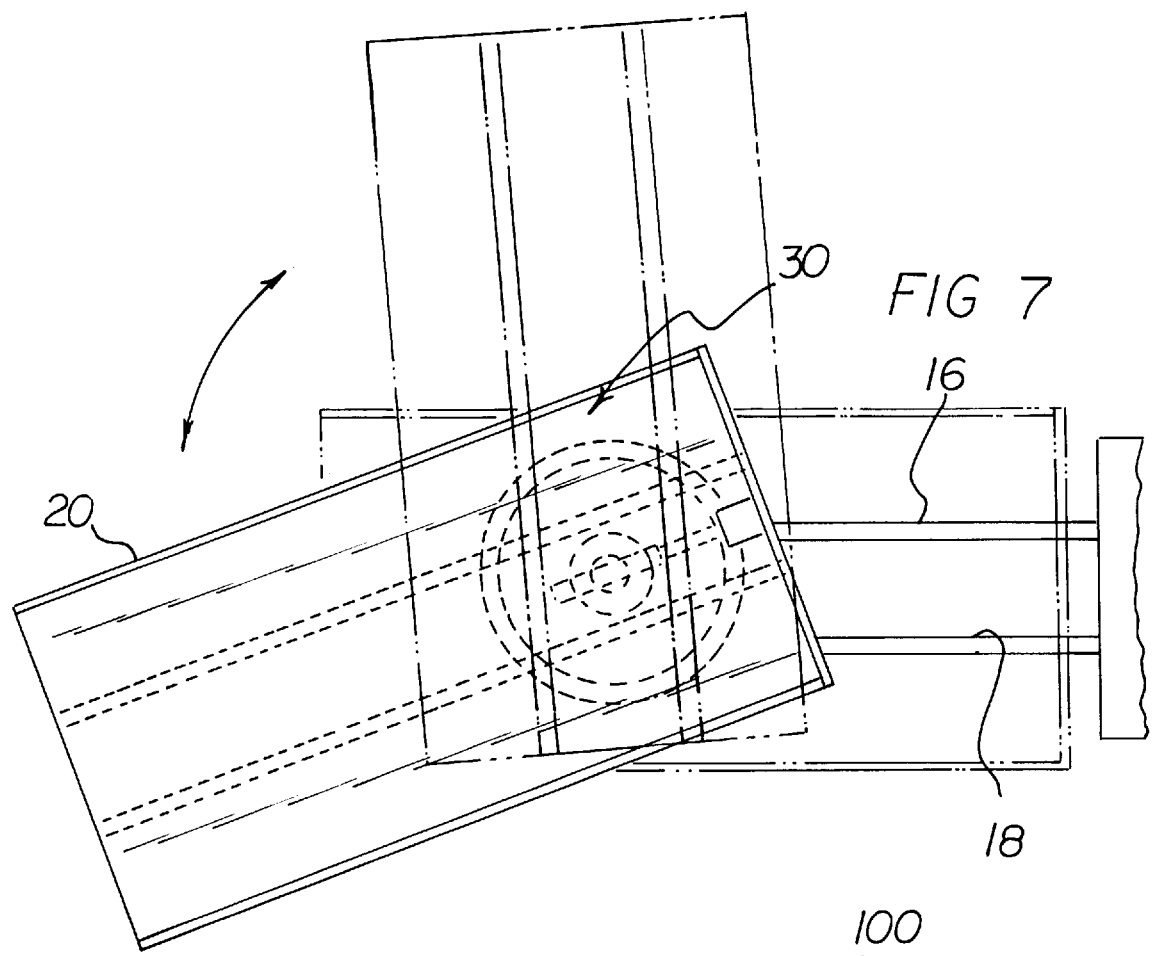
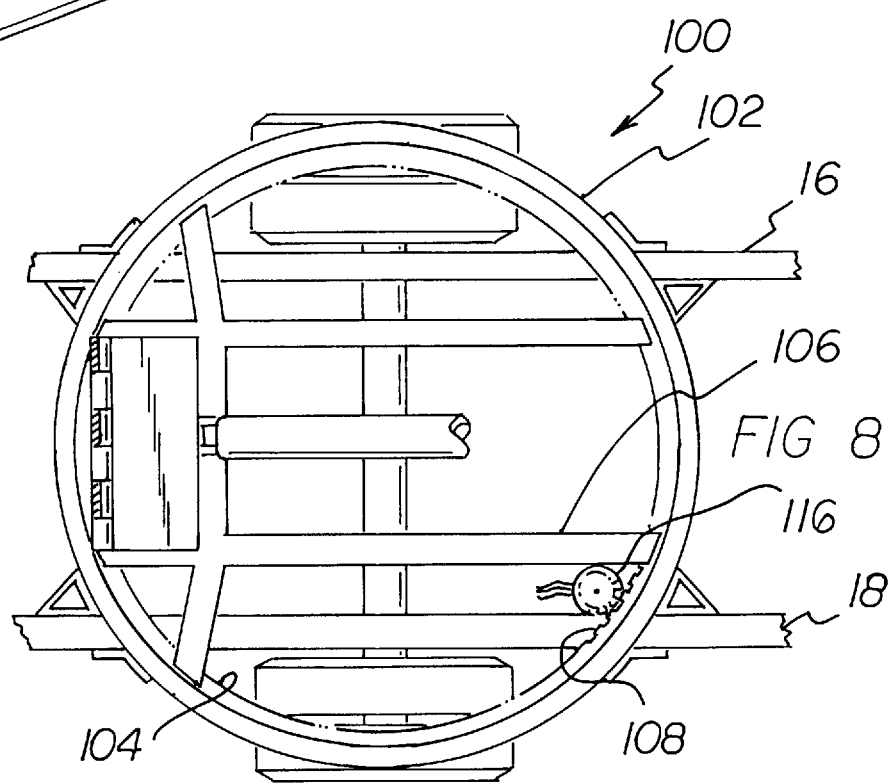

VEHICLE WITH IMPROVED MULTI-POSITIONABLE FLATBED

BACKGROUND OF THE INVENTION

1. Field of the Invention

The present invention relates to a vehicle with improved multi-positionable flat-bed and more particularly pertains to allowing the rotation of a vehicle flat-bed in excess of 180 degrees.

2. Description of the Prior Art

The use of vehicle flat-beds is known in the prior art. More specifically, vehicle flat-beds heretofore devised and utilized for the purpose of towing vehicles are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 5,001,362 to Pijanowski. Such reference discloses a vehicle with a flat bed capable of rotating less than 90 degrees, wherein the swivel means thereof is fixedly coupled to an underside of the flat bed.

In this respect, the vehicle with improved multi-positionable flat-bed according to the present invention substantially departs from the conventional concepts and designs of the prior art, and in so doing provides an apparatus primarily developed for the purpose of allowing the rotation of a vehicle flat-bed in excess of 180 degrees.

Therefore, it can be appreciated that there exists a continuing need for a new and improved vehicle with improved multi-positionable flat-bed which can be used for allowing the rotation of a vehicle flat-bed in excess of 180 degrees. Further, there is an apparent need for a vehicle flat bed with the swivel means thereof being fixedly coupled with respect to the frame of the vehicle. In this regard, the present invention substantially fulfills this need.

SUMMARY OF THE INVENTION

In view of the foregoing disadvantages inherent in the known types of vehicle flat-beds now present in the prior art, the present invention provides an improved vehicle with improved multi-positionable flat-bed. As such, the general purpose of the present invention, which will be described subsequently in greater detail, is to provide a new and improved vehicle with improved multi-positionable flat-bed which has all the advantages of the prior art and none of the disadvantages.

To attain this, the present invention essentially comprises a truck with a cab at a front end thereof and a frame situated at a rear end thereof. Note FIG. 2. The frame includes a pair of spaced parallel frame bars, as shown in FIG. 1. The truck further has a flat bed adapted for supporting a vehicle thereon. The truck also includes securement means for coupling the flat bed to the frame bars. A first component of the securement means is swivel means including a pair of spaced support plates coupled between the frame bars adjacent the rear ends thereof. See FIG. 4. The support plates have a pair of concentric central bores formed therein about a vertical axis. Rotatably coupled in the bores is a swivel assembly. Such swivel assembly first includes a swivel pin. A circular swivel plate is coupled to a top of the swivel pin and a pair of arms extend radially from a central extent thereof between the spaced support plates. The swivel means, in generally, further includes a pair of swivel hydraulics. Each swivel hydraulic has a first end coupled to an inner surface of each of the frame bars and a second end pivotally coupled to a first end of an associate connector rod. Such connector rods can best be seen in FIG. 3. Each connector rod further has a second end pivotally coupled to an end of an associated arm of the swivel assembly. By this structure, the swivel plate is adapted to rotate upon the retraction and expansion of the swivel hydraulics. Next provided is a hinge having a first component coupled to a rear of the swivel plate on a top face thereof. Note FIG. 6. A second component of the hinge is hingably coupled to the first component and adapted to pivot with respect to the first component about a horizontal axis. As such, the hinge is adapted to rotate coincidentally with the swivel plate. With reference now to FIG. 5, an intermediate support is included. Such intermediate support includes a pair of parallel spaced support bars coupled to sides of the second component of the hinge. In use, the support bars are adapted to pivot and rotate coincidentally with the second component of the hinge and swivel plate, respectively. It should be noted that the flat bed includes a pair of spaced parallel I-bars coupled to a bottom surface thereof. With reference still to FIG. 5, it can be seen that the I-bars are slidably coupled with respect to the support bars of the intermediate support. The flat bed further includes a slide hydraulic having a first end coupled to one of the I-bars and a second end coupled to a corresponding support bar, as shown in best detail in FIG. 6. By such structure, the flat bed is adapted to slide linearly with respect to the hinge and intermediate plate upon the retraction and expansion of the slide hydraulic. Finally, a lift means is provided having a pair of lift arms. As shown in FIG. 2, such lift arms include a first lift arm with a first end pivotally coupled to the intermediate support and a second lift arm with a first end pivotally coupled to the swivel plate of the swivel means opposite the hinge and a second end pivotally coupled to a second end of the first lift arm. The lift means has associated therewith a lift hydraulic with a first end pivotally coupled to the swivel plate of the swivel means adjacent the hinge and a second end pivotally coupled to the second ends of the lift arms. To this end, the lift hydraulic is adapted to lift a front end of the flat bed about the axis of the hinge upon the retraction and expansion of the lift hydraulic.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved vehicle with improved multi-positionable flat-bed which has all the advantages of the prior art vehicle flat-beds and none of the disadvantages.

It is another object of the present invention to provide a new and improved vehicle with improved multi-positionable flat-bed which may be easily and efficiently manufactured and marketed.

It is a further object of the present invention to provide a new and improved vehicle with improved multi-positionable flat-bed which is of a durable and reliable construction.

An even further object of the present invention is to provide a vehicle flat bed with the swivel means thereof being fixedly coupled with respect to the frame of the vehicle.

Still yet another object of the present invention is to provide a new and improved vehicle with improved multi-positionable flat-bed that employs a novel lifting assembly.

Still another object of the present invention is to allow the rotation of a vehicle flat-bed in excess of 180 degrees.

Lastly, it is an object of the present invention to provide a new and improved truck with a cab at a front end thereof and a frame situated at a rear end thereof, the truck including a flat bed adapted for supporting a vehicle thereon and securement mechanism for coupling the flat bed to the frame. The securement mechanism includes a swivel mechanism situated between the frame and the flat bed. The swivel mechanism is adapted to rotate the flat bed about a vertical axis. The swivel mechanism is further designed to rotate the flat bed about a vertical axis through a span of at least 180 degrees. A hinge is situated between the frame and the flat bed to permit the pivoting of the flat bed about a horizontal axis. Next provided is a lift mechanism situated between the frame and the flat bed for allowing the lifting of a front end of the flat bed about the axis of the hinge.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a top view illustration of the preferred embodiment of the vehicle with improved multi-positionable flat-bed constructed in accordance with the principles of the present invention.

FIG. 2 is a side view of the present invention.

FIG. 5 is a front view of the intermediate support and hinge of the present invention.

FIG. 6 is a side cross-sectional view of the flat bed, intermediate support and associated slide hydraulic taken along line 6—6 shown in FIG. 5.

FIG. 7 is a top view of the present invention in use.

FIG. 8 is a top view of the swivel means of an alternate embodiment of the present invention.

Similar reference characters refer to similar parts throughout the several views of the drawings.

DESCRIPTION OF THE PREFERRED EMBODIMENT

Figure 3:
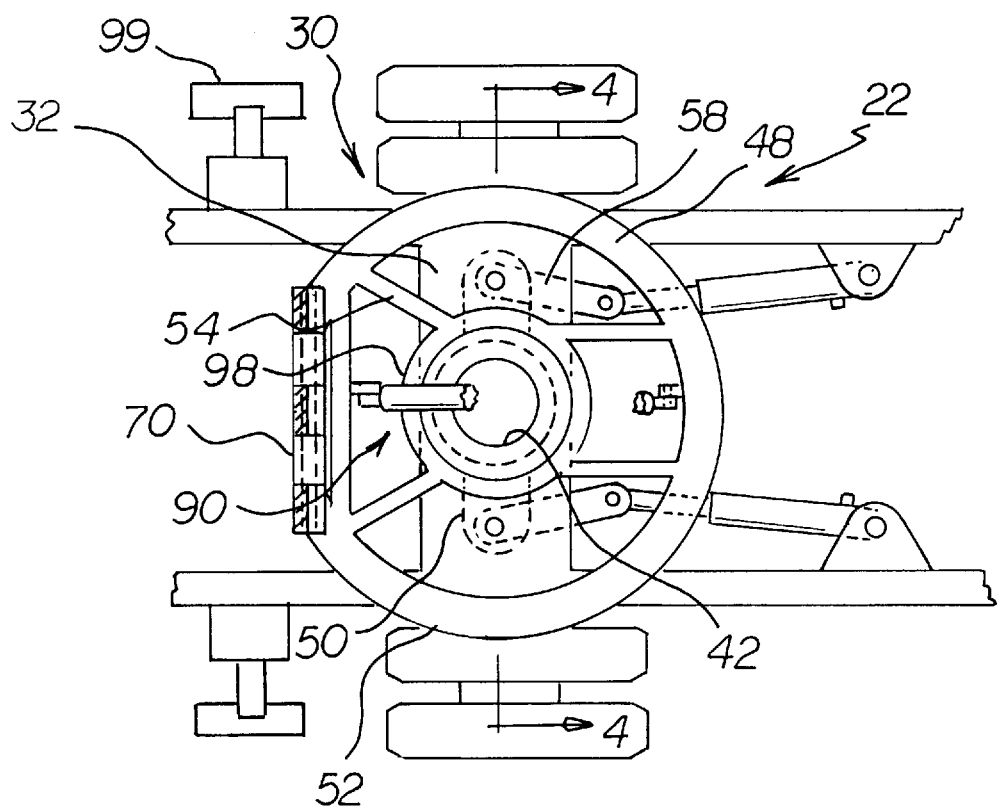
FIG. 3 is a top cross-sectional view of the swivel means of the preferred embodiment of the present invention taken along line 3—3 shown in FIG. 2.

With reference now to the drawings, and in particular to FIG. 1 thereof, a new and improved vehicle with improved multi-positionable flat-bed embodying the principles and concepts of the present invention and generally designated by the reference numeral 10 will be described.

The present invention, the new and improved vehicle with improved multi-positionable flat-bed, is comprised of a plurality of components. Such components in their broadest context include a swivel means, a hinge, an intermediate support, and a lift means. Such components are individually configured and correlated with respect to each other so as to attain the desired objective.

More specifically, it will be noted that the system 10 of the present invention includes a truck 12 with a cab 14 at a front end thereof and a frame 16 situated at a rear end thereof. Note FIG. 2. The frame includes a pair of spaced parallel frame bars 16,18, as shown in FIG. 1. The truck further has a flat bed 20 adapted for supporting a vehicle thereon. The truck also includes securement means 22 for coupling the flat bed to the frame bars. Some details of the various components of the securement means have been left out for the purpose of clarity. Such details are may be found by reference to U.S. Pat. No. 5,011,362 to Pijanowski.

Figure 4:
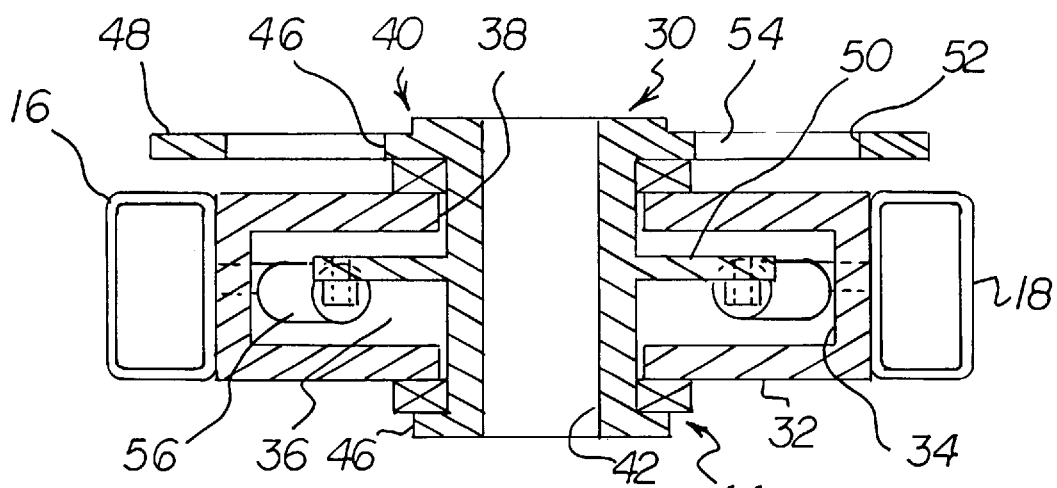
FIG. 4 is a cross-sectional view of the swivel means taken along line 4—4 shown in FIG. 3.

A first component of the securement means is swivel means 30 including a pair of spaced horizontal rectangular support plates 32 coupled between the frame bars and above a rear axle of the truck. As shown in FIG. 4, the support plates are spaced and coupled together via a pair of side plates 34 thereby defining an interior space 36. The support plates have a pair of concentric central bores 38 formed therein about a vertical axis. Rotatably coupled in the bores is a swivel assembly 40. Such swivel assembly first includes a swivel pin 42. The swivel pin has annular bearing assemblies 44 situated between the pin and support plates for affording smooth rotation. Further, the swivel pin is formed with flanges 46 to preclude vertical movement of the swivel pin within the bores. A circular swivel plate 48 is coupled to a top of the swivel pin and a pair of diametrically opposed arms 50 extend radially from a central extent thereof between the spaced support plates within the interior space. The swivel plate, as shown in FIG. 3, comprises an annular ring 52 with a plurality of connection members 54 integrally coupled between the swivel pin 54 and an inner circumference of the annular ring 52.

The swivel means further includes a pair of swivel hydraulics 56. Each swivel hydraulic has a first end coupled to an inner surface of an associated frame bar adjacent a front of the frame. A second end of each swivel hydraulic is pivotally coupled to a first end of an associate connector rod 58. Such connector rods can best be seen in FIG. 3. Each connector rod further has a second end pivotally coupled to an end of an associated arm of the swivel assembly. By this structure, the swivel plate is adapted to rotate upon the retraction and expansion of the swivel hydraulics. It is imperative to understand that the length of connector rods is such that the hydraulics are adapted to rotate the flat bed about a vertical axis through a span of at least 180 degrees. For the purpose of describing the remaining components of the present invention, it, should be noted that the swivel plate has a normal orientation with both the hydraulics having a similar length.

Next provided is a hinge 70 having a first component 72 coupled to a rear of the swivel plate on a top face thereof when the swivel plate is in the normal orientation thereof. Note FIG. 6. A second component 74 of the hinge is hingably coupled to the first component and adapted to pivot with respect to the first component about only a horizontal axis. As such, the components of the hinge are adapted to rotate coincidentally with the swivel plate.

With reference now to FIG. 5, an intermediate support 76 is included. Such intermediate support includes a pair of parallel spaced support bars 78 coupled to sides of the second component of the hinge. Ideally, such support bars each have a rectangular cross-section. In use, the support bars are adapted to pivot and rotate coincidentally with the second component of the hinge and swivel plate, respectively. When the swivel plate is in the normal orientation thereof, the support bars are parallel with the frame bars of the frame.

It should be noted that the flat bed includes a pair of spaced parallel I-bars 80 coupled to a bottom surface thereof. With reference still to FIG. 5, it can be seen that the I-bars are slidably coupled with respect to the support bars of the intermediate support. The flat bed further includes a slide hydraulic 82 having a first fixed with respect to one of the I-bars and the flat bed and a second end fixed in relation to a corresponding support bar of the intermediate support, as shown with the greatest detail in FIGS. 1 & 6. By such structure, the flat bed is adapted to slide linearly with respect to the hinge and intermediate plate upon the retraction and expansion of the slide hydraulic.

Finally, the securement means includes a lift means 90 having a pair of lift arms 92. As shown in FIG. 2, such lift arms include a first lift arm 94 with a first end hingably coupled to the intermediate support and a second lift arm 96 with a first end hingably coupled to the swivel plate of the swivel means opposite the hinge. A second end of the second lift arm is pivotally coupled to a second end of the first lift arm. The lift means has associated therewith a lift hydraulic 98 with a first end pivotally coupled to the swivel plate of the swivel means adjacent the hinge and a second end pivotally coupled to the second ends of the lift arms. To this end, the lift hydraulic is adapted to lift a front end of the flat bed about the axis of the hinge upon the retraction and expansion of the lift hydraulic.

For the purpose of providing stability during the loading of vehicles onto the flat bed, a pair of hydraulic stabilizer pads are attached to the outer surface of a rear portion of the frame bars. Such stabilizer pads each comprise a hydraulic piston attached to the associated frame bar and extended outwardly and downwardly therefrom. A pad is pivotally attached to a bottom of each piston.

In the alternate embodiment 100 shown in FIG. 8, the aforementioned swivel means is substituted with an annular constraint 102 fixedly coupled to the frame over the axle of the truck. An annular rotatable insert 104 is slidably coupled within a groove formed in an inner circumference of the annular constraint. A swivel plate 106 is coupled to the rotatable insert and is adapted to swivel coincidentally therewith. The rotatable insert has a plurality of gear teeth 108 formed along an entire inner circumference thereof. The swivel means of the alternate embodiment further includes a pinion mechanism 116 fixedly coupled with respect to the frame in engagement with the gear teeth of the rotatable insert. In use, the pinion mechanism is adapted to effect rotation of the rotatable insert and swivel plate upon the actuation thereof. As in the preferred embodiment, the hinge and lift hydraulic of the alternate embodiment is attached to the swivel plate. It should be understood that while a gear type mechanism and hydraulic pistons are utilized in the previous embodiments for the purpose of swiveling the flat bed, other means such as chains and/or lever arms may also be employed to accomplish the same and still remain within the scope of the present invention.

In operation, the present invention provides a more versatile swivel plate and truck flat bed that is adapted to rotate over 90 degrees clockwise and 90 degrees counter clockwise with respect to the normal orientation thereof. In the alternate embodiment, the swivel plate and flat bed are adapted for rotating over 200 degrees.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved truck with a cab at a front end thereof and a frame situated at a rear end thereof, the frame including a pair of spaced parallel frame bars, the truck further having a flat bed adapted for supporting a vehicle thereon, the truck further including securement means for coupling the flat bed to the frame bars, the securement means including:

swivel means including a pair of spaced support plates coupled between the frame bars adjacent the rear ends thereof, the support plates having a pair of concentric central bores formed therein about a vertical axis, a swivel assembly including a swivel pin rotatably coupled in the bores, a circular swivel plate coupled to a top of the swivel pin, and a pair of arms extending radially from a central extent of the swivel pin between the spaced support plates, the swivel means further including a pair of swivel hydraulics having a first end coupled to an inner surface of each of the frame bars and a second end pivotally coupled to a first end of an associate connector rod, each connector rod having a second end pivotally coupled to an end of an associated arm of the swivel assembly, whereby the swivel plate is adapted to rotate upon the retraction and expansion of the swivel hydraulics;

a hinge having a first component coupled to a rear of the swivel plate on a top face thereof and a second component hingably coupled to the first component and adapted to pivot with respect to the first component about a horizontal axis, whereby the hinge is adapted to rotate coincidentally with the swivel plate;

an intermediate support including a pair of parallel spaced support bars coupled to sides of the second component of the hinge, whereby the support bars are adapted to pivot and rotate coincidentally with the second component of the hinge and swivel plate, respectively;

said flat bed including a pair of spaced parallel I-bars coupled to a bottom surface thereof, the I-bars slidably coupled with respect to the support bars of the intermediate support, the flat bed further including a slide hydraulic having a first coupled to one of the I-bars and a second end coupled to a corresponding support bar, whereby the flat bed is adapted to slide linearly with respect to the hinge and intermediate plate upon the retraction and expansion of the slide hydraulic; and a lift means having a pair of lift arms including a first lift arm with a first end pivotally coupled to the intermediate support and a second lift arm with a first end pivotally coupled to the swivel plate of the swivel means opposite the hinge and a second end pivotally coupled to a second end of the first lift arm, the lift means further including a lift hydraulic with a first end pivotally coupled to the swivel plate of the swivel means adjacent the hinge and a second end pivotally coupled to second ends of the lift arms, whereby the lift hydraulic is adapted to lift a front end of the flat bed about the axis of the hinge upon the retraction and expansion of the lift hydraulic.

2. A truck as set forth in claim 1 wherein the lift hydraulic and second lift arm are pivotally coupled to opposite sides of the swivel means.

3. A truck with a cab at a front end thereof and a frame situated at a rear end thereof, the truck including a flat bed adapted for supporting a vehicle thereon and securement means for coupling the flat bed to the frame, the securement means including:

swivel means situated between the frame and the flat bed, the swivel means adapted to rotate the flat bed about a vertical axis;

a hinge situated between the frame and the flat bed, the hinge adapted to allow the pivoting of the flat bed about a horizontal axis; and a lift means situated between the frame and the flat bed for allowing the lifting of a front end of the flat bed about the horizontal axis of the hinge;

said swivel means adapted to rotate the flat bed about a vertical axis through a span of at least about 180 degrees;

wherein the swivel means includes a swivel assembly rotatably coupled to the frame with two arms coupled with respect to the swivel assembly, the swivel means further including two counteracting swivel hydraulics each having a first end coupled to the frame and a second end pivotally coupled with respect to one of the arms for rotating the flat bed;

wherein the swivel means further includes two connector rods each having a first end pivotally coupled to one of the arms and a second end pivotally coupled to one of the swivel hydraulics.

4. A truck as set forth in claim 3 wherein the swivel means is fixed in relation to the frame.

5. A truck as set forth in claim 3 wherein the lift means includes a pair of lift arms including a first lift arm with a first end pivotally coupled with respect to the flat bed and a second lift arm with a first end pivotally coupled to the swivel means, the lift means further including a lift hydraulic with a first end pivotally coupled to the swivel means and a second end pivotally coupled to second ends of the lift arms.

6. A truck as set forth in claim 3 wherein said swivel means is adapted to rotate the flat bed about a vertical axis through a span of at least 200 degrees.

7. A truck as set forth in claim 3 wherein an intermediate support is situated between the frame and the flat bed for allowing the flat bed to linearly slide with respect to the frame.

8. A truck as set forth in claim 3 and further including a pair of hydraulic stabilizer pads attached to a rear portion of the frame for providing stability during the loading of vehicles onto the flat bed.

9. A truck with a cab at a front end thereof and a frame situated at a rear end thereof, the truck including a flat bed adapted for supporting a vehicle thereon and securement means for coupling the flat bed to the frame, the securement means including:

swivel means situated between the frame and the flat bed, the swivel means adapted to rotate the flat bed about a vertical axis;

a hinge situated between the frame and the flat bed, the hinge adapted to allow the pivoting of the flat bed about a horizontal axis; and a lift means situated between the frame and the flat bed for allowing the lifting of a front end of the flat bed about the axis of the hinge;

said lift means including at least one a pair of lift arms including a first lift arm with a first end pivotally coupled with respect to the flat bed and a second lift arm with a first end pivotally coupled to the swivel means, the lift means further including a lift hydraulic with a first end pivotally coupled to the swivel means and a second end pivotally coupled to second ends of the lift arms.

* * * * *